3,600,484
SINTERING FERROELECTRIC MATERIALS SUCH AS BARIUM TITANITE IN A VACUUM
Edward J. Smoke, Edison, and Howard Wichansky, Eatontown, N.J., assignors to the United States of America as represented by the Secretary of the Army
No Drawing. Filed Feb. 6, 1969, Ser. No. 797,237
Int. Cl. C04b 35/00, 35/64
U.S. Cl. 264—65                               2 Claims

ABSTRACT OF THE DISCLOSURE

The dielectric properties of ferroelectric materials such as barium titanate are upgraded by sintering the dry pressed shapes in a vacuum having partial air pressures of 1 to 1000 microns. Maintaining the vacuum during cooling is optional.

---

The invention described herein may be manufactured, used, and licensed by or for the Government for governmental purposes without the payment to us of any royalty thereon.

BACKGROUND OF THE INVENTION

This invention relates in general to a method of upgrading the dielectric properties of ferroelectric materials and in particular to a method of upgrading the dielectric properties of barium titanate.

Both kiln firing and hot pressing have been known as techniques of treating ferroelectric materials in order to obtain a ceramic of high dielectric constant. In the case of kiln firing, various atmospheres have been used during firing as for example, oxygen, steam, carbon dioxide, etc. The difficulty with kiln firing of ferroelectric materials is that the resulting ceramic has not been characterized by a sufficiently high dielectric constant and dielectric losses have been high. At present, ceramics produced by hot pressing ferroelectric materials have exhibited properties superior to any of those produced by kiln firing. However, hot pressing is expensive and not efficient in producing large quantities of useable ceramics for electrical applications as for example, for capacitors.

SUMMARY OF THE INVENTION

The general object of this invention is to provide a method of treating ferroelectric materials so that ceramics having superior electrical properties are obtained. A further object of this invention is to provide such a method that will be economic.

It has now been found that ceramics of improved dielectric properties can be obtained economically by dry pressing the ferroelectric material and then firing the dry pressed ferroelectric material in such partial air pressures that no reduction of the ferroelectric material occurs partial air pressures used are dependent on the particular ferroelectric material being treated and is in the range of partial pressures immediately preceding the partial pressure where reduction of the ferroelectric material would occur.

DETAILED DESCRIPTION OF THE PREFERRED EMBODIMENT

The raw powder of a typical ferroelectric material, to wit, a commercially available barium titanate is first dry pressed and then fired to maturity under controlled atmospheric conditions. In this instance, the dry pressed barium titanate is fired in a tube furnace in moderate vacuum of about 1 micron to about 1000 microns. This vacuum is applied through the peak temperature of 1200 degrees C. to 1400 degrees C. and through subsequent cooling to ambient temperature. The peak temperature is reached in about 7 hours. The moderate vacuum may be initiated at furnace startup. However, the influence of vacuum is considered minimal at the lower temperatures. In addition, the vacuum may be discontinued during the cooling cycle. In a systematic study of the effect of partial firing pressures, an appreciable improvement in dielectric constant is obtained for samples of barium titanate treated by the above described methods. This improvement amounts to a 47 percent increase; from 2550 with samples fired in oxygen to 3750 with samples fired in a 20 micron vacuum. The dissipation factor traverses a minimum and the DC resistivity a maximum for samples fired in an 85 micron vacuum. One particular firing at about 1350 degrees C. utilizing a moderate vacuum of about 1 micron to about 1000 microns in which the vacuum was discontinued during cooling yielded a dielectric constant of 5720 and a dissipation factor of 0.004 when measured at 1 kilohertz; and a dielectric constant of 5450 and a dissipation factor of 0.022 when measured at 1 megahertz.

Other ferroelectric materials amenable to the treatment of this invention include alkaline earth titanates such as strontium titanate, zirconates such as calcium zirconate, niobates such as potassium niobate, and stannates such as barium stannate.

In addition, other means of obtaining partial air pressures besides vacuum are contemplated as coming within the scope of the invention as for example; the use of $CO/CO_2$ mixtures, hydrogen, and partial inert gas atmospheres.

The initial fabrication of the ferroelectric material is accomplished by means well known in the art as for example dry pressing, doctor blading, etc.

The time and temperature of firing is dependent upon the particular ferroelectric material being treated and is readily determinable by one skilled in the art.

It should also be pointed out that the invention aids in the elimination of voids in the resulting densified body.

Thus, the instant invention provides an economic means of upgrading the dielectric properties of ferroelectric materials by the use of vacuum or partial air pressures during firing without the onset of reduction.

The foregoing description is to be considered merely as illustrative of the invention and not in limitation thereof.

What is claimed is:

1. In a method of making a barium titanate ferroelectric article comprising dry pressing commercially available barium titanite, firing the dry pressed form to maturity, and cooling; wherein the improvement comprises firing the dry pressed form at about 1200 to 1400 degrees C. while applying a vacuum in the range of partial air pressures preceding the partial pressure where reduction of the barium titanate would occur and in the range of between about 1 to 1000 microns and cooling to ambient temperature to upgrade the dielectric properties of the barium titanate.

2. The method according to claim 1 wherein said vacuum is maintained while cooling to ambient temperature.

References Cited

UNITED STATES PATENTS

| | | | |
|---|---|---|---|
| 2,511,216 | 6/1950 | Miller | 264—65 |
| 2,529,719 | 11/1950 | Wentworth | 264—65 |
| 2,646,359 | 7/1953 | Wainer | 264—65 |
| 2,696,651 | 12/1954 | Gravley | 264—65 |
| 3,028,248 | 4/1962 | Glaister | 264—65 |
| 3,283,044 | 11/1966 | Brown et al. | 264—65 |
| 3,472,776 | 10/1969 | Derbyshire | 264—65 |

FOREIGN PATENTS

| | | | |
|---|---|---|---|
| 826,143 | 12/1959 | Great Britain | 106—39 |
| 977,389 | 12/1964 | Great Britain | 106—39 |
| 1,027,939 | 4/1966 | Great Britain | 264—65 |

JULIUS FROME, Primary Examiner

J. H. MILLER, Assistant Examiner

U.S. Cl. X.R.

106—39; 264—61